Nov. 29, 1927.
F. A. BYLES
1,650,604
ELECTRIC REGULATOR
Filed Oct. 17. 1924
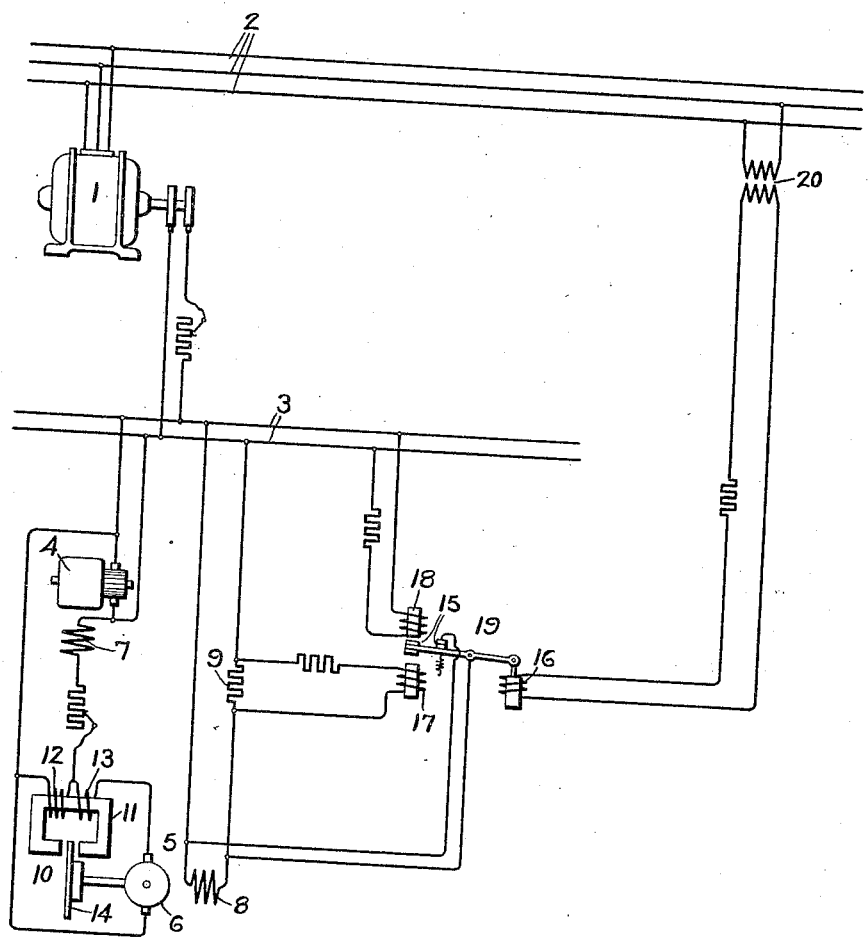
Inventor:
Frank A. Byles;
by
His Attorney.

Patented Nov. 29, 1927.

1,650,604

UNITED STATES PATENT OFFICE.

FRANK A. BYLES, OF SCHENECTADY, NEW YORK, ASSIGNOR TO GENERAL ELECTRIC COMPANY, A CORPORATION OF NEW YORK.

ELECTRIC REGULATOR.

Application filed October 17, 1924. Serial No. 744,278.

My invention relates to electric regulators comprising a vibratory device which operates in response to the condition being regulated to control suitable regulating means, and anti-hunting means; and particularly to electric regulating systems in which the desired regulation is obtained by means of a vibratory regulator which controls the excitation of an exciter, which, in turn, is connected so that it controls the condition to be regulated.

An object of my invention is to provide improved means for avoiding any undesirable undercompounding of a vibratory regulator which may be effected by the anti-hunting means thereof.

My invention will be better understood from the following description, taken in connection with the accompanying diagrammatic drawing which shows a voltage regulating system embodying my invention, and its scope will be pointed out in the appended claims.

Referring to the drawing, 1 represents a generator which supplies current to an electric circuit 2. The generator 1 is excited from an exciter bus 3 which is energized by an exciter 4. For controlling the excitation of the generator 1 so as to maintain the voltage thereof constant, a voltage regulator of the type disclosed and claimed in Thompson Patent No. 1,365,566 granted Jan. 11, 1921 and assigned to the same assignee as this application, is shown. The regulator comprises a counter electromotive force machine 5 connected in a field circuit of the exciter 4, and a vibratory device 19 which controls the excitation of the counter electromotive force machine in response to the voltage of the generator. As shown, the counter electromotive force machine 5 is a motor having its armature winding 6 connected in series with the shunt field 7 of the exciter, and its field winding 8 connected across the exciter bus 3 with the resistor 9 in series therewith.

In order to prevent excessive variations in the speed of the motor 5, a suitable brake 10 is provided therefor. As shown in the drawing the brake is of the magnetic drag type and comprises a core 11 on which the windings 12 and 13 are wound and between the poles of which rotates a disk 14 of conducting material connected to rotate with the armature of the motor 5. The winding 12 is connected in parallel with the armature winding 6 of the motor 5 and the winding 13 is connected in series therewith so that braking effect of the brake increases as the current through the motor armature and the counter electromotive force of the motor increase.

The vibratory device 19 is arranged to vary the excitation of the motor 5 by opening and closing the contacts 15 which are connected so as to complete a short circuit around the field winding 8 when they are closed. The vibratory device 19 comprises a voltage winding 16, an anti-hunting winding 17, and a compensating winding 18. The voltage winding 16 is connected across the circuit 2 by a transformer 20 so that it is responsive to the voltage of the circuit 2 which, in the system shown, is the characteristic of the output of the generator it is desired to maintain constant. If some other characteristic were to be regulated, this winding would be connected so as to be responsive to variations thereof. The winding 16 is arranged in any suitable manner so that it opens the contacts 15 when the voltage of the exciter 2 exceeds a predetermined value and closes the contacts when the voltage decreases below a predetermined value.

The anti-hunting winding 17 is connected and arranged so that its energization is varied by the opening and closing of the contacts 15 to cause a rapid opening and closing of the contacts. As shown, the winding 17 is connected across the resistor 9 so that the current through the winding 17 varies inversely with the current through the field winding 8. For example, when the contacts 15 are closed, the current through the winding 17 increases and the current through the field winding 8 decreases, whereas when the contacts 15 are opened the current through the winding 17 decreases and the current through the winding 8 increases. The winding 17 is arranged in any suitable manner so that when the contacts 15 are closed and the excitation of the winding 17 is increased, the increase in the excitation of the winding 17 effects the opening of the contacts 15, and when the contacts 15 are opened and the excitation of the winding 17 is decreased, the decrease in the excitation of the winding 17 effects the closing of the contacts 15.

It is well known in the art that as the load connected to the circuit 2 increases, the excitation of the generator has to be increased in order to maintain the voltage constant. Therefore, the regulator has to short circuit the field winding 8 more of the time in order to obtain this increased excitation of the generator. Consequently, the energization of the winding 17 is increased so that the average pull of the winding is increased. Since each of the windings 16 and 17 is arranged so that an increase in the excitation thereof tends to open the contacts 15, it will be evident that the anti-hunting winding has an undercompounding effect. Therefore, as the load on the circuit increases, the voltage which the regulator maintains constant decreases.

In order to overcome this undercompounding effect of the anti-hunting winding, I provide the compensating winding 18, which is connected so that it is energized in accordance with a characteristic of the output of the exciter. As shown, the compensating winding 18 is energized in accordance with the voltage of the exciter 4. The compensating winding 18 is arranged so that it opposes the anti-hunting winding 17. Since the regulator operates to increase the exciter voltage when the load increases, the energizations of both of the windings 17 and 18 are increased by an increase in the load.

Therefore, it is evident that by properly adjusting the winding 18, it can be made to compensate to any desired degree the undercompounding tendency of the anti-hunting winding 17.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is,—

1. In a regulating system for controlling a predetermined electrical characteristic of the output of a generator wherein the desired regulation is effected by varying the excitation of a counter electromotive force machine in the field circuit of an exciter for the generator, a vibratory device for controlling the excitation of said counter electromotive force machine having a winding responsive to the electrical characteristic of the output being regulated, an anti-hunting winding connected and arranged so that the energization thereof varies with the variations in the excitation of said counter electromotive force machine produced by said vibratory device, and a compensating winding responsive to an electrical characteristic of the output of the exciter supplied to said generator for modifying the operation of said vibratory device to compensate the compounding tendency of said anti-hunting winding.

2. In a regulating system for controlling a predetermined electrical characteristic of the output of a generator wherein the desired regulation is effected by varying the current flowing through a field circuit of a counter electromotive force machine in the field circuit of an exciter for the generator, a vibratory device for controlling the current in said field circuit of the counter electromotive force machine comprising a winding responsive to the electrical characteristic of the output of the generator being regulated, an anti-hunting winding connected and arranged so that its energization varies with the excitation of said field current of said counter electromotive force machine and a compensating winding responsive to an electrical characteristic of the output of the excitation supplied to said generator for compensating the compounding tendency of said anti-hunting winding, said anti-hunting and compensating windings being arranged in opposition to each other.

3. In a regulating system for controlling the voltage of a generator wherein the desired regulation is effected by varying the currents flowing through a field circuit of a counter electromotive force machine in the field circuit of an exciter for the generator, a vibratory device for controlling the current in said field circuit of the counter electromotive force machine comprising a winding responsive to the voltage of said generator, an anti-hunting winding connected to the field circuit of said counter electromotive force machine, and a compensating winding responsive to the voltage of said exciter for compensating the compounding tendency of said anti-hunting winding.

In witness whereof, I have hereunto set my hand this 16th day of October, 1924.

FRANK A. BYLES.